(No Model.)
C. PROUTY.
SAW.
No. 565,298. Patented Aug. 4, 1896.
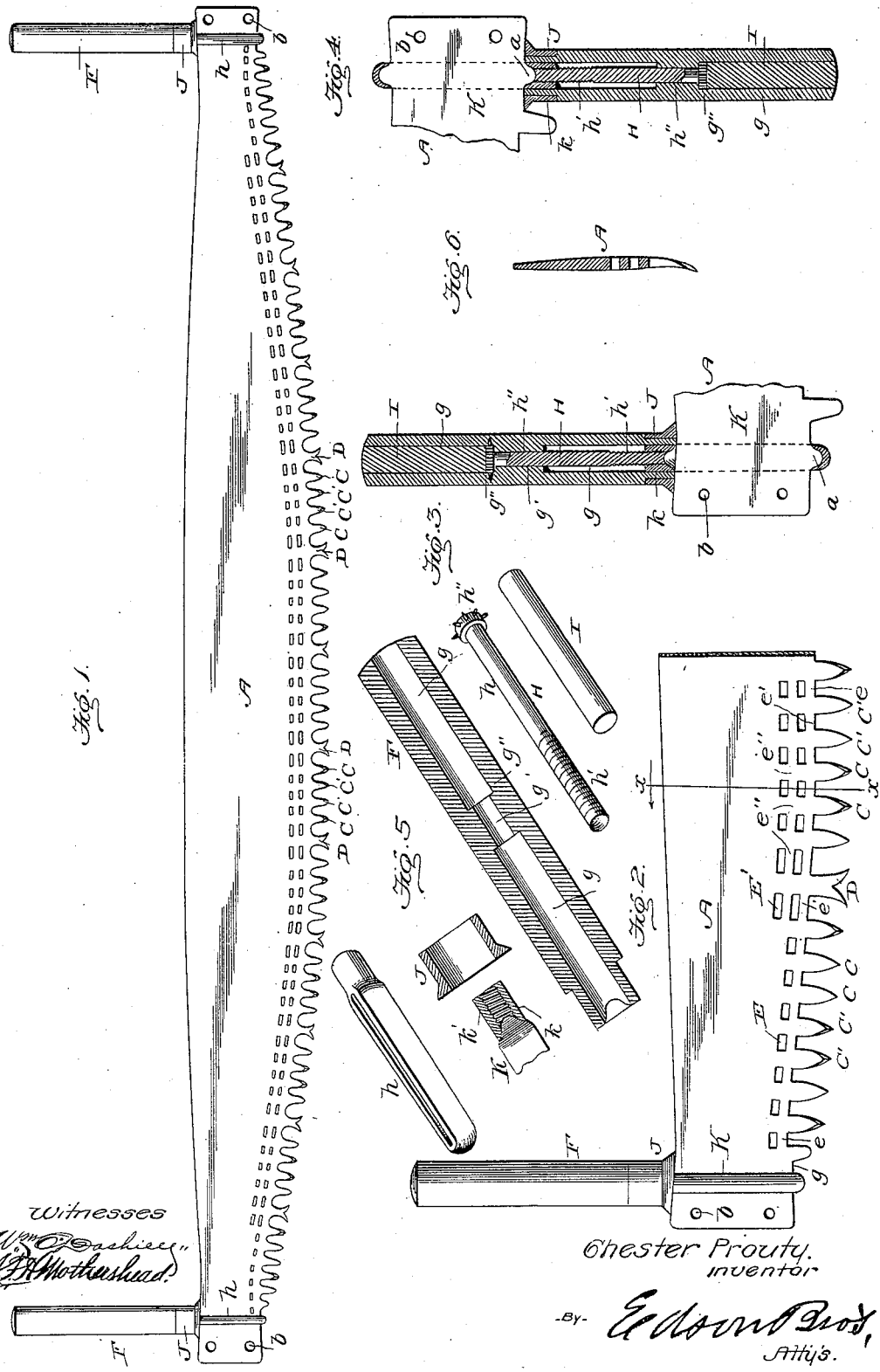
Witnesses
Wm. O. Dashiell
J. R. Mothershead
Chester Prouty,
Inventor
By— Edson Bros,
Atty's.

UNITED STATES PATENT OFFICE.

CHESTER PROUTY, OF DUBOIS, PENNSYLVANIA.

SAW.

SPECIFICATION forming part of Letters Patent No. 565,298, dated August 4, 1896.

Original application filed February 12, 1894, Serial No. 499,951. Divided and this application filed May 10, 1895. Serial No. 548,857. (No model.)

*To all whom it may concern:*

Be it known that I, CHESTER PROUTY, a citizen of the United States, residing at Dubois, in the county of Clearfield and State of Pennsylvania, have invented certain new and useful Improvements in Saws; and I do hereby declare the following to be a full, clear, and exact description of the invention, such as will enable others skilled in the art to which it appertains to make and use the same.

The subject-matter of the present application is in part a division of a prior application filed by me on the 12th day of February, 1894, Serial No. 499,951.

The invention contemplates, first, a novel construction of saw-blade and reversible handle adapted to the saw-blade for the purpose of being applied to either the front or back edge, and to be held thereon against the possibility of working off the end of the blade, whereby the handle may be applied to suit the convenience of the operator in cutting fallen trees, which lie in many positions and are ofttimes difficult of access; secondly, to an improved mode of gumming the saw by a novel construction, which serves to retain practically the initial strength of the sawblade and provides for the easy and expeditious lengthening of the teeth with the use of a file or other tool without special appliances; thirdly, in a novel organization or grouping of the cutter-teeth, all as will be hereinafter fully described, and defined by the claims.

To enable others skilled in the art to which my invention relates, I have illustrated the same in the accompanying drawings, forming a part of this specification, in which—

Figure 1 is an elevation of my saw, showing the handles applied thereto. Fig. 2 is an enlarged view of a portion of a saw-blade having its cutting and raking teeth constructed in accordance with my invention and illustrating the oblong longitudinal slots forming the bars or bridges by which the saw may be gummed by a file or other tool and without the aid of special gumming machinery. Fig. 3 is a sectional elevation illustrating the handle applied to the upper edge of the saw-blade. Fig. 4 is a similar view with the handle in its reversed position. Fig. 5 is a detail view of parts of the handle. Fig. 6 is a cross-sectional view of the saw-blade on the plane indicated by the dotted line *x x* of Fig. 2.

Like letters of reference denote corresponding parts in all the figures of the drawings.

A is the saw-blade. The plate of metal from which this plate is to be produced is first rolled to the desired size from suitable steel, which is then cut to the proper shape for a saw, after which the ends of the blade are cut with the small projections *a a* on the bottom edge, and the holes *b b* are then punched through the blade near its ends. I then cut out the teeth from the lower edge of the saw-blade by means of dies which are made the shape of the perforations and spaces or gullets between the teeth, and at the same operation these dies cut out of the saw-blade oblong pieces of metal which produce in the blade the slots or openings forming the bars or bridges between the saw-teeth, said perforations and bases of the teeth being concentric with the curved front edge of the saw from end to end thereof. After the saw has been thus fashioned I proceed to grind the same in the manner shown, described, and claimed in my prior application to produce a saw which on its cutting edge is of lower gage or increased thickness at its middle portion than at the ends and which on its back edge is of higher gage or less thickness at its middle portion than at the ends thereof. The lateral or side faces of the teeth are hollowground or beveled in concave lines from their points to their bases, and each tooth is thus made to taper in thickness or decrease in gage from their points upward to the sawblade, into which the lines of the teeth are merged to a line of uniform gage which runs longitudinally from end to end of the sawblade back of the base-line of the teeth.

In crosscut-saws such as used for sawing logs and heavy timber it has been customary heretofore to alternate the teeth throughout the length of the saw-blade, that is, to point and set one tooth on one side and the adjacent tooth on the opposite side, this arrangement being continued throughout the entire length of the saw. With this construction when one tooth becomes dull or broken the adjacent teeth on either side of the broken tooth cut on the same side with no intervening tooth to cut on the opposite side, whereby the two sides are caused to work unevenly by reason of a double portion of work being put on the remaining teeth on the side to which the broken tooth belonged. While under ordinary conditions an alternate arrangement of teeth works well, I have discovered by long experience that for sawing some kinds of timber it is advantageous and beneficial to group the oppositely-disposed cutting-teeth, that is, to point and set two or more adjacent teeth on one side and the next two or more on the opposite side, and so on, and while this is beneficial in sawing some varieties of timber it works equally well in all kinds of timber and has the additional advantages that when one tooth is lost it leaves an adjacent tooth to perform its work.

By reference to Fig. 1 of the drawings, in which I show four cutter-teeth between each pair of raker-teeth, C C C' C' designate the cutting-teeth, and D the clearing or raking teeth. The group of four cutting-teeth C C C' C', between two adjacent raking-teeth D D, are disposed or arranged in pairs, with the teeth C' C' between the teeth C C. The pair of teeth C C, which lie next to the adjacent raking-teeth D D, are pointed and beveled on the same side or face, while the other pair of teeth C' C', between the teeth C C, are beveled and pointed on the opposite or reverse face or side. Thus if one of the teeth C or C' is broken or otherwise injured its twin tooth will remain to do the work on that side, and the operativeness of the saw will not be seriously impaired or affected, whereas under the old system of filing the remaining adjacent teeth on opposite sides would both cut on the same side of the saw, and an uneven operation of the two sides would be the result.

It is evident that the number of teeth composing each group can be varied or increased, as may be desired, as, for instance, each group of teeth may consist of three, four, or more teeth, with the teeth of each group pointed on the same side and alternate groups pointed on the opposite sides, as hereinbefore described, so that all the teeth of each group cut in opposition to all the teeth composing the adjacent groups of teeth at either side thereof. In Fig. 2 I have shown the clearing or raking teeth D separated from each other by groups of cutting-teeth, the part of the saw-blade to the right of the raker-tooth D being provided with six cutter-teeth, while the part of the saw-blade to the left of the raker-tooth D is shown as having seven cutter-teeth, but it is to be understood that any preferred arrangement of the raking-teeth relatively to the cutting-teeth may be adopted or that the clearing-teeth may be entirely omitted. In some places and for some kinds of timber I may place two oppositely-pointed single teeth between the clearing or raking teeth and the groups of teeth at either side, the tooth adjacent to the group being pointed oppositely from the teeth of that group.

I have not deemed it necessary to illustrate the fine teeth, because any one skilled in the art will readily supply the same to the saw-blade if it is desired to provide the blade with the fine initial cutter-teeth.

It is well known that large crosscut-saws designed for heavy work, such as sawing logs and heavy timber, require frequent sharpening, whereby the teeth are rapidly worn down, necessitating also frequent gumming to preserve a proper length of teeth for effective work. In light saws the length of the teeth is kept uniform by cutting down the blade between the teeth with a file, but in large saws this has been impracticable by reason of the labor and the time involved, and therefore special gumming tools or machinery are usually employed. The use of hand-tools by inexperienced persons frequently results in breaking or bending the saws, and gumming-machines are not always available or accessible when required. With a view to overcoming these difficulties I have devised the construction shown by Fig. 2, which consists in forming in the saw-blade, opposite of and directly above the spaces between the teeth, one or more series of slots E E', whereby the length of the teeth is practically increased, but leaving between the teeth the narrow bars or bridges e e' to sustain and support each tooth from those adjacent to it, which bars or bridges, when the teeth are worn down so as to necessitate gumming, can be cut out with a file or other tool. These slots or openings E are of such length that their ends are substantially in line with the edges of the teeth, or so that they will be in line with said edges of the teeth when the teeth are filed down to a point where it is necessary to remove the bars or bridges. Thus the length of the openings will depend somewhat upon the style of the teeth, that is, whether the edges are parallel at the base or whether they converge toward the point throughout their length, the slots and bridges being concentric with the curved front cutting edge of the saw-blade.

As shown in the drawings, the spaces or gullets between the teeth and at the edge of the saw-blade are nearly rectangular, and the oblong slots E E' are parallel to or concentric with the edge of the saw-blade, the end edges of the slot E E' being in line with the edges of the teeth C' C D, thus leaving but very little of the metal to be removed when filing. The bars or bridges e e' between the slots and gullets retain practically the initial strength of the saw-blade, so that it is not perceptibly weakened by the formation of the slots E E' therein, and thus the blade is made to present the necessary stiffness in the hands of the operator to secure the best results.

I attach importance to the disposition of the slots E or E' longitudinally with respect to the saw-blade and substantially concentric with the curved cutting edge thereof, to provide the narrow longitudinal bars or bridges above the gullets, because by this arrangement the slots are not liable to be packed with the drifting fibers cut from the wood and the saw-blade is not weakened by the formation of the slots therein. I am aware that previous to my invention saws have been gummed by punching round holes in the blade at and above the apices of the teeth, also by cutting three slots transversely to the axis of the blade between each pair of teeth, of which slots two lie in line with the side edges of the teeth; also by having transverse slots cut in the blade with their longer axis in line with the length of the narrow gullets produced in the edge of the blade; but such prior devices are objectionable for two reasons. First, the longer axis of the slots being transverse to the line of the saw-blade, they are so narrow that the sawdust will not properly accumulate therein to be drifted out of the kerf in the reciprocating movements of the saw, but the dust will clog up in these narrow slots and interfere with the proper working of the saw, and, secondly, the holes or slots arranged transversely of the blade operate to weaken the blade to such a degree that it does not have the required stiffness and rigidity in the hands of the operator to secure the best results, and this is true especially of the saw gummed with large round holes between teeth which have their opposing edges inclined to each other. I overcome these practical objections in crosscut-saws by the novel disposition of the slots herein shown and described, and thereby I am able to produce a saw which while it has the necessary strength and stiffness in the direction of the pull and push thereon in the hands of the operator can be easily and quickly gummed without weakening the blade, and is not clogged by accumulation of the fibers or sawdust therein, because the slots being in the direction of the length of the blade the fibers that accumulate therein lie loose in the slots and drift with the blade while operating in the kerf and will drop from the slots when the saw is exposed or withdrawn sufficiently from the log of wood to expose the slots.

When the teeth are worn down to a point where it is necessary to gum the saw in order to provide sufficient clearance, the bars or bridges $e'$ are cut out by means of a file or other implement, whereby the teeth are restored to their original length and the saw brought to a condition in which it is most efficient when used.

In the drawings, particularly at the right-hand end thereof in Fig. 2, I have shown two rows of openings, the openings of one series being indicated at E and the other at E', those of the upper series being directly above those in the lower row, thereby forming double bridges or bars $e'\,e''$, which are designed to be successively cut out as the teeth wear down.

It has also heretofore been proposed to gum saws by an analogous construction; but in some cases of which I have knowledge the openings, or at least a portion of them, have been formed below the upper extremities of the gullets between the teeth. This is open to serious objections for the reason that a portion of the sawdust and the wood fibers carried in the upper portions of the gullets escape past the sides or edges of the teeth into the openings or slots, where it becomes packed and binds the saw in the kerf in a manner to impede its freedom of movement. In order to overcome this difficulty, I form the openings above the gullets and between the teeth so as to prevent to as great an extent as possible the sawdust from entering said openings and becoming packed therein, which is an important feature of my invention.

The best results are attained by cutting the upper portions of the gullets on a line concentric to or parallel with the cutting edge of the saw-blade, and preferably by very slightly rounding the corners, so that the upper and lower sides of the bridges are substantially straight and parallel to each other, whereby the uniform tension and strength of the saw-blade is preserved when the bridges are cut out in gumming the saw.

I construct the ends of my crosscut-saw blade in a manner to preserve the initial strength of the blade and enable a handle to be applied to either edge, the back or front thereof.

Heretofore it has been customary to notch one end of the blade, usually the lower edge, for the reception of the end of the eye or loop of the shank, the handle being secured to the shank by a screw-clamp. It is manifest that with one edge of the blade notched there is no provision for securely fastening the handle in a reverse position, and that in order to provide for such reversal of the handle it is necessary to notch both edges of the blade. It is also evident that these notches, whether in one or both edges, impair the strength of the blade and form a line of weakness along which the blade is liable to fracture under undue strain. To provide efficient means for securing the handle both in the usual and in the reverse position and to provide for the ready and expeditious removal of the handle in cases of emergency, I construct the saw-blade with a projection $a$ on its edge near the end, and slightly expand or broaden the blade from said projection toward its end, combined with a handle having a slotted shank or eye adapted to receive the end of the saw-blade and adapted to abut against the projection on said saw-blade to prevent accidental displacement when the screw-clamp is tightened to clamp the handle and the eye upon the blade. This projection $a$ is provided on one edge of the blade, preferably the lower, and this projection $a$ is preferably rounded, as shown, and from the projection the end of the blade is slightly and gradually widened or broadened toward the extreme end thereof.

The handle F has a longitudinal passage $g$ produced therein, the middle portion of which is contracted at $g'$ to produce the shoulder $g''$. A fastening-bolt H is provided with a threaded portion $h'$, a plain smooth portion $h$, and a head $h''$ above the smooth portion $h$, said head having spurs or teeth projecting therefrom. This bolt is passed or forced through the upper part of the bored handle until its head $h''$ rests against the upper shoulder $g''$, formed by the contracted center $g'$ of the bore or passage, its teeth being embedded or forced into the wood to hold the bolt securely in place against turning in the handle, and the threaded part of the bolt projects well down into the lower part of the bore or passage $g$, but terminates within or above the end of the handle. The upper part of the handle, above the headed bolt, is filled by a dowel or plug I, which is driven into the upper passage or bore, and which rests upon or against the head of the bolt, the outer end of the plug being turned or finished substantially flush with the upper end of the handle. This plug serves to strengthen or reinforce the bored handle and also to keep the bolt in place. To the lower end of the handle, about the mouth or opening of the bore or passage therein, is secured a ferrule J. This ferrule is made of steel in the proper form and is case-hardened to give the necessary strength and stability thereto and to prevent it from being worn when clamped down tightly upon the saw-blade. The loop or eye K is made preferably of malleable metal with a solid collar or head $k$, in which is formed a central screw-threaded aperture $k'$. This loop or eye is adapted to be fitted around the expanded or widened end of the saw-blade, and the apertured threaded head $k$ of said loop is inserted into the hollow end of the handle F, so that the end of the fixed bolt therein will enter the threaded aperture in the head of the loop. By turning the handle, and with it the bolt H, the loop or eye K and the handle will be drawn together by reason of the threaded engagement of the head $k$ and bolt H, and thus the ferrule J will be brought to bear firmly upon one edge of the blade and the loop is drawn to bear equally secure against the opposite edge of the blade.

The handle may be applied against either edge of the blade. When it is fitted to have its ferrule bear against the back edge of the blade, the loop or eye is arranged to abut against the outside of the projection or lug $a$, so that if the handle works loose the expanded or widened part of the blade will prevent the handle from coming off the end of the blade. When the handle is reversed, the ferrule is placed over the projection $a$ and partially embraces and engages the same. When applied and used in this manner, there will seldom be occasion for the quick removal of the handle, but the rounded projection will offer no obstruction, as the ferrule will ride over the same as soon as the handle is unscrewed sufficiently to provide the necessary freedom between the loop or eye and the saw-blade. To provide for a secure attachment of the handle in either position, as for work where there is no occasion for a quick removal, I form in the lower edge of the eye or loop a recess or cavity for the reception of the projection $a$, so that when the handle is applied in its reversed position the projection extends into said cavity, and when the handle is applied to the saw in its upright position the ferrule J embraces the projection, whereby the handle will be securely interlocked with the blade when it assumes either of its two positions with respect thereto and a rigid connection is secured between the blade and handle. Ordinarily these reversible handles have a tendency to work loose, and as soon as this occurs they are liable to slip off the blade, if the edges thereof be parallel; but by expanding or broadening the blade from the projection toward its extremity, even though the parts work loose, the handle will still be prevented from slipping off the end of the blade.

The perforations or holes $b$ are provided for the passage of the screws or rivets for the attachment of permanent handles to the saw-blade in case such permanent handles are preferred to detachable handles or in the event of the latter not being obtainable.

Having thus fully described my invention, what I claim as new, and desire to secure by Letters Patent, is—

1. A crosscut-saw having its teeth separated by intervening gullets or spaces and provided, above the base-line of the teeth, with oblong slots which run longitudinally with respect to the blade and are located directly above the gullets, substantially as and for the purposes described.

2. A crosscut-saw having its teeth separated by intervening gullets and provided, above the base-line of the teeth, with oblong narrow slots, the longitudinal axes of which are in the direction of the length of the saw, said slots arranged directly above the gullets and terminate on lines substantially parallel to the edges of the teeth, narrow bridges being formed between the gullets and slots, which bridges extend longitudinally of the saw-blade, parallel to the cutting edge thereof, substantially as described.

3. A crosscut-saw having its teeth separated from each other by intervening gullets, and provided with a double row of oblong slots, one row above the other row, and with all of the slots running in the direction of the length of the saw-blade, each slot having its ends terminating on a line parallel to the opposing edges of two adjacent teeth, the rows of openings being disposed with relation to each other to form narrow longitudinal bars or bridges at the bases of the teeth and similar longitudinal bars between the corresponding openings of the two rows, the longer axes of all of said slots being parallel to the cutting edge of the saw-blade, as and for the purposes described.

4. A detachable saw-handle provided with a longitudinal bore and a central offset $g'$ within said bore, a fixed stem or bolt H rigid with said handle by having its toothed head $h''$ embedded in the handle and against the offset $g'$, and with its free threaded end $h'$ terminating inside of the lower end of the handle, a plug I driven into the longitudinal bore of the handle, to fill the upper part thereof, and resting against the head $h''$ of the stem or bolt, and a saw-loop having the cylindrical interiorly-threaded head $k$ which is fitted into the lower open end of the handle and receives the free threaded end of said fixed stem or bolt H, substantially as and for the purposes described.

5. A crosscut-saw having cutter-teeth arranged in groups between the raker-teeth and with all the teeth having their faces ground in concave lines from their points to the lines where they are merged into the saw-blade, one group of cutting-teeth between two adjacent raker-teeth having their edges beveled on one side and the next group provided with beveled edges on the opposite side, substantially as and for the purposes described.

In testimony whereof I affix my signature in presence of two witnesses.

CHESTER PROUTY.

Witnesses:
G. M. ALCORN,
G. WOODRING.